DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

893 O.G. 404

T893,013

PROCESS FOR PRODUCING SPINNABLE, BASIC DYEABLE (POLYETHYLENE TEREPHTHALATE) COPOLYESTERS

Charles J. Kibler and Bobby J. Sublett, both of P.O. Box 511, Kingsport, Tenn. 37462

Filed Mar. 10, 1971, Ser. No. 123,088
Int. Cl. C08g *17/013*
U.S. Cl. 260—75 S
No Drawing. 12 Pages Specification

Preparation of basic-dyeable poly(ethylene terephthalate) and analogous copolyesters having improved spinning characteristics by the employment in the preparation of the poly(ethylene terephthalate), or analogous copolyesters containing sulfonated comonomers, of a titanium catalyst in combination with an acid phosphate additive which functions to eliminate or substantially reduce spinneret problems when the copolyester containing the catalyst and additive is melt spun. Examples include comonomers such as sulfonated isophthalic acid, $MgHTi(OC_4H_9)_6$ and ethyl acid phosphate whereby spinning at least 1,000 pounds of the molten basic-dyeable copolyester can be carried out for 40 to 100 or more hours without spinneret difficulties.